(12) United States Patent
Allard et al.

(10) Patent No.: US 7,892,437 B2
(45) Date of Patent: Feb. 22, 2011

(54) METHOD OF WATER MANAGEMENT IN THE AGGREGATE INDUSTRY

(75) Inventors: Barry Allard, Port Coquitlam (CA); James Allard, Port Coquitlam (CA)

(73) Assignee: Allard Contractors Ltd., Port Coquitlam, British Columbia ( * ) Notice: Subject to any disclaimer, the term of this patent is extended or adjusted under 35 U.S.C. 154(b) by 247 days.

(21) Appl. No.: 12/058,505

(22) Filed: Mar. 28, 2008

(65) Prior Publication Data
US 2008/0237139 A1    Oct. 2, 2008

Related U.S. Application Data

(60) Provisional application No. 60/908,594, filed on Mar. 28, 2007.

(51) Int. Cl.
*C02F 1/52* (2006.01)

(52) U.S. Cl. .................. 210/710; 210/726; 210/727; 210/747; 210/787

(58) Field of Classification Search .............. 210/702
See application file for complete search history.

(56) References Cited

U.S. PATENT DOCUMENTS

| | | | | |
|---|---|---|---|---|
| 3,483,983 | A | * | 12/1969 | Lindstrom ............. 210/167.31 |
| 5,833,863 | A | * | 11/1998 | Richards et al. ............. 210/712 |
| 5,843,315 | A | * | 12/1998 | Baughn et al. ............... 210/723 |
| 6,582,610 | B2 | * | 6/2003 | Williams et al. ............ 210/712 |
| 7,153,436 | B2 | * | 12/2006 | Bair et al. .................... 210/709 |
| 7,635,434 | B2 | * | 12/2009 | Mickelson et al. .......... 210/710 |
| 2005/0145548 | A1 | * | 7/2005 | Rhoades ..................... 210/96.2 |

FOREIGN PATENT DOCUMENTS

JP        2000073332 A    *    3/2000

\* cited by examiner

*Primary Examiner*—Peter A Hruskoci
(74) *Attorney, Agent, or Firm*—Fasken Martineau DuMoulin LLP

(57) ABSTRACT

A method of managing water is provided, in which the water is discharged from an aggregate plant, and therefore contains a large number of fines. The water is first passed through a mesh screen to remove large particles and then collected in a sump. From the sump the water is pumped to a centrifugal cyclone, where some of the fines are separated from the water. Flocculent is then applied to the water, before the water is collected in a pond.

14 Claims, 5 Drawing Sheets

METHOD OF WATER MANAGEMENT IN THE AGGREGATE INDUSTRY

This application claims the benefit of U.S. Provisional Patent Application No. 60/908,594 filed Mar. 28, 2007, which is hereby incorporated by reference.

FIELD OF THE INVENTION

This invention relates to methods of reducing sediment, and more particularly to reducing sediment produced by aggregate operations.

BACKGROUND OF THE INVENTION

Aggregate is the basic material used in construction, including sand, gravel, crushed stone, slag, and recycled concrete. Aggregates are a basic resource, and are necessary for modern construction. Aggregates are the basic input materials for concrete and asphalt as well as base materials used under foundations and roads.

Aggregate is provided through the use of quarries, which are present throughout the world, and which require bedrock deposits of aggregate quality. Large quarry with sand and gravel operations exist near virtually all population centers. These are capital-intensive operations, utilizing large earth-moving equipment, belt conveyors, and machines specifically designed for crushing and separating various sizes of aggregate to create distinct product stockpiles.

Aggregate is needed for any kind of construction. Roads require aggregate for continual maintenance and rebuilding. Homes, offices, warehouses, shopping centers, and workplaces all require foundations composed of aggregate, as well as concrete footers, asphalt parking lots, manufactured bricks, blocks and poured walls.

The aggregate industry requires access to water, and frequently adds large amounts of sediment to such water. This can raise environmental concerns, particularly when the aggregate producer is located in, or near to, a residential area.

In the prior art, flocculants have been used within the water to bind the sediment, which can then be filtered, allowing the filtered water to be placed back into the environment. Flocculants, or flocculating agents, are chemicals that are used to promote flocculation by causing colloids and other suspended particles in liquids to aggregate, forming a floc. Flocculants are used in water treatment processes to improve the sedimentation or filterability of small particles. For example, a flocculent may be used in water filtration to aid removal of microscopic particles which would otherwise cause the water to be cloudy and which would be difficult or impossible to remove by filtration alone.

Many flocculants are multivalent cations such as aluminum, iron, calcium or magnesium. These positively charged molecules interact with negatively charged particles and molecules to reduce the barriers to aggregation. In addition, many of these chemicals, under appropriate pH and other conditions, react with water to form insoluble hydroxides which, upon precipitating, link together to form long chains or meshes, physically trapping small particles into a larger floc. Other factors such as pH, temperature, and salinity can induce flocculation or influence flocculation rates.

A typical embodiment of a prior art water management system is shown in FIG. 1. In such a system a series of source and settling ponds are linked together by gravity feed culverts or pumps.

With reference to FIG. 1, a prior art water management system may operate as follows:

1. First and second settling ponds 10, 15, serve as a final step for sediment control before the water is discharged into the nearby river 20.
2. Sediment is cleaned out of the first and second settling ponds 10, 15 into adjacent first and second silt ponds 25, 30, respectively, where the sediment is left to dry before being hauled to a first pit 35, which is typically located offsite.
3. First and second settling ponds 10, 15 are balanced by a connecting culvert 65. Pump storage facility 40 located between first and second settling ponds 10, 15, recycles water from second settling pond 15 to second source pond 55.
4. Second and third source ponds 55, 60 are balanced by a connecting culvert 70. Source water from second source pond 55 is pumped to first source pond 52 when needed or otherwise pumped to the aggregate site for dust control.
5. First source pond 52 provides water to the various pieces of operation equipment at the aggregate site, including a coarse aggregate washer, and/or a sand plant.
6. Fourth settling pond 90, the first stage of settling, receives water from the washer, sand plant, and run-off from the aggregate pit 85
7. Third settling pond 80 is gravity fed from fourth settling pond 90.
8. Sediment is cleaned out of third and fourth settling ponds 80, 90 regularly into fourth silt pond 95. Once the silt is dry (which may take up to 6 months) the silt is hauled off to first pit 35.
9. Fourth settling pond 90 receives clean water skimmed off the top of fourth silt pond 95.
10. Third settling pond 80 is retained all day before being sent across in the afternoon through pipe 100 passing under road 95 to second settling pond 15 for retention. Steps 1 through 10 are then repeated.

While the above detention/retention water management system may do an adequate job of preventing overflow from entering river 20, it may not be capable of handling severe storm conditions. Such conditions provide severe storm-water diversions to the system. These storm-water diversions overtax the capacity of the system resulting in discolored water being discharged into river 20. Another disadvantage is that the system of ponds requires a significant amount of space, time and maintenance for its upkeep and operation. For example, maintenance of the system requires front-end loaders to regularly clean pond mud out settling ponds 10, 15, 80, 90 as well as gravel trucks to haul the silt offsite. Also, it is estimated that the ponds take up approximately 1600 m$^2$ of space that could be used otherwise. This consumption of time, space and money along with the potential threat, in severe storm conditions, of endangering river 20, suggests a need for alternatives for dealing with the gravel pit water issues.

SUMMARY OF THE INVENTION

The system and method according to the invention provides exceptional capacity for separating fines from pit process water. Results and observations have shown improvements in visual water clarity, fines recovery, and drying characteristics. In addition, the solids separated from the process water, referred to herein as "floc-sand", are easier to work with (with respect to consistency and drying time) and to transport than pond mud, the result of traditional water management practices.

What is provided is an improved water management system, including the use of a derrick tower and flocculent. In a preferred embodiment of the invention the flocculent is used with a hopper, which has exceptional capacity for separating fines from pit process water.

The invention provides a method of managing water, comprising the steps of: (a) receiving water discharged from an aggregate plant; (b) passing said water through a mesh screen; (c) collecting the water in a sump; (d) passing the water though a plurality of centrifugal cyclones; (e) applying flocculent to the water; and (f) discharging the water into a pond, the pond having a wall of concrete blocks.

The flocculant may be applied to said water just before said water enters the pond. The water may enter the pond through a three outlet manifold. The manifold may be positioned over a hopper. Floc-sand may be removed from the pool, and allowed to set for a day.

The centrifugal cyclones may be elevated in a tower, wherein fines are removed from the water, and collected beneath the tower.

The flocculent may be stored and diluted within a flocculent storage facility. The flocculent may include a first and second flocculent, the first flocculent added to the water after the water leaves the centrifugal cyclones and the second flocculent added to the water just before the water enters the pond.

DETAILED DESCRIPTION

The method and system according to the invention uses a flocculent, such as that provided by Chemical and Consulting Solutions, LLC based out of Texas. The system will be explained below, in its entirety, beginning with water being discharged from the plant (by a coarse aggregate washer, sand screw, sand plant, etc.) and ending with the fines being collected and hauled offsite.

In the method according to the invention, process water from aggregate and sand washing is initially passed through a coarse mesh screen to remove large rocks or debris, and is then collected into sump 200. Water from sump 200 is gravity fed through pipe 205 (which may be a 1' section of a 10" pipe 210) feeds intake pump 215.

Figure 1:
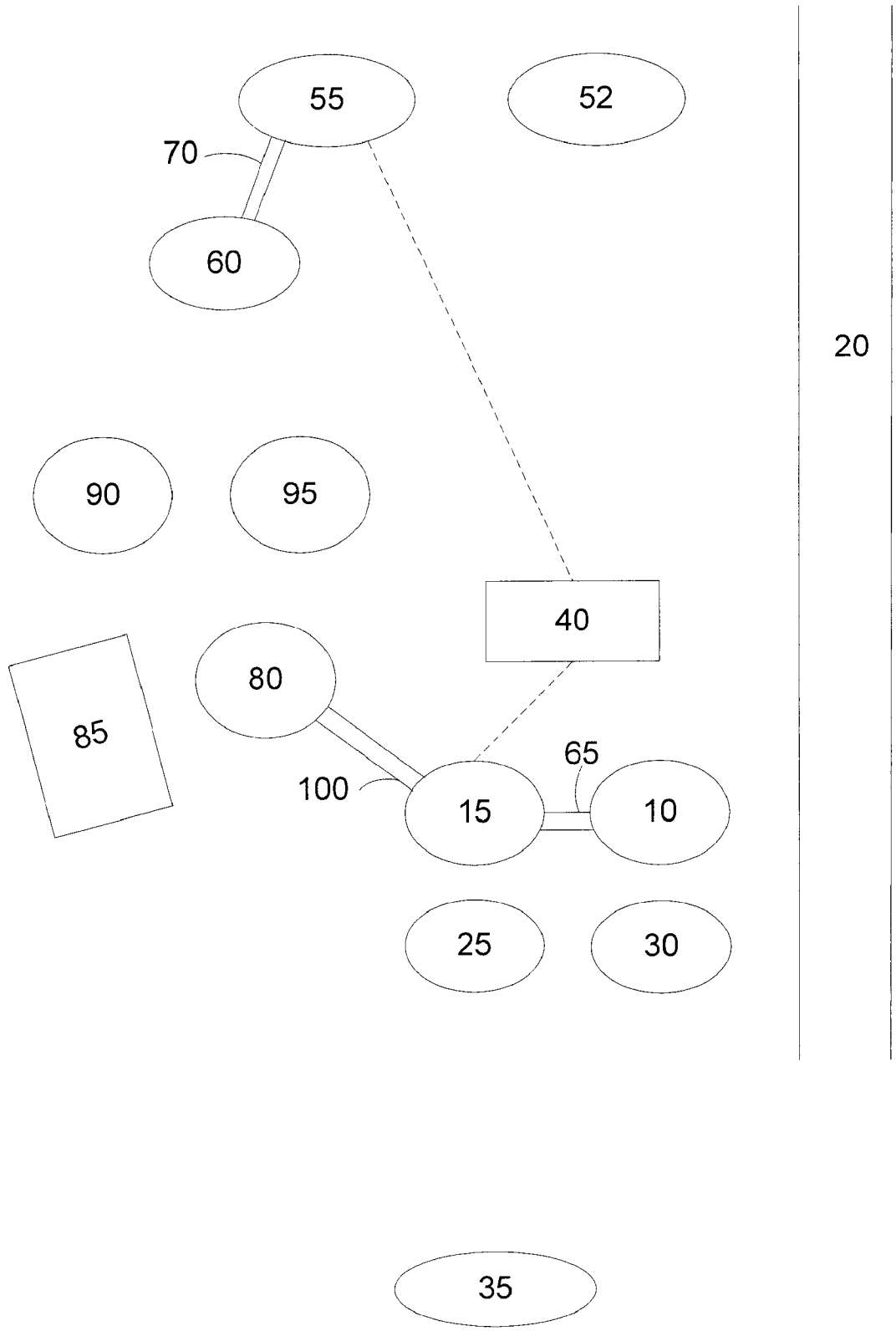
FIG. 1 is a block diagram of a typical prior art water management system.
Figure 2:
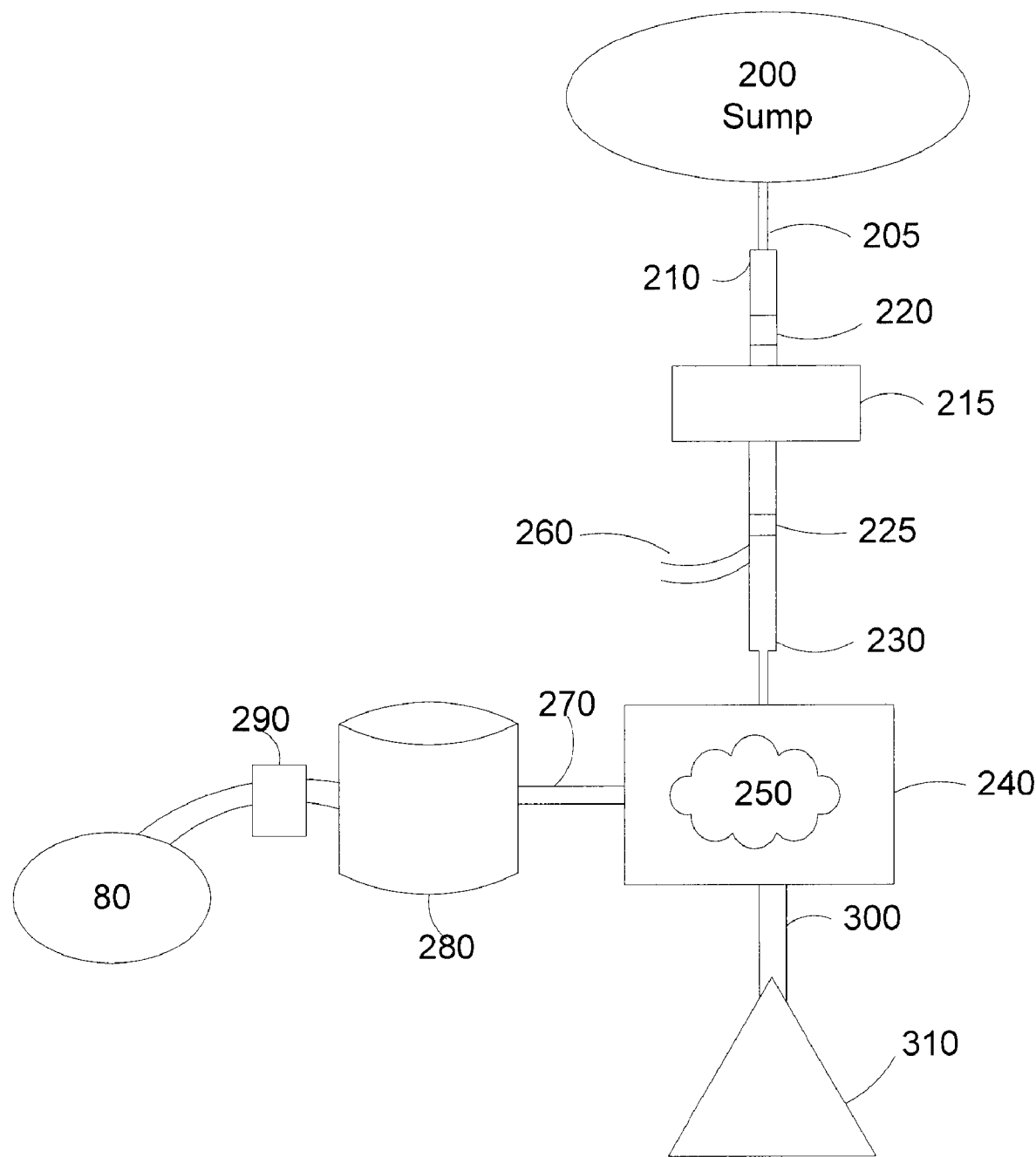
FIG. 2 is a block diagram of the derrick tower water flow according to the invention.

Gate valves 220, 225 are respectively located just before and after the intake and outtake of pump 215. Pump 215's outtake (which may be approximately 8") is reduced (possibly to approximately 6") by an immediate flanged section of pipe 230. Pipe 230 leads up to derrick tower assembly 240 as shown in FIG. 2. At derrick tower assembly 240, the process water is fed into an assembly of twelve centrifugal cyclones 250. Pipe 305 (possibly approximately 4") forks off outtake of pump 215 as shown in FIG. 2.

Once the process water enters cyclones 250, centrifugal force separates the water into solids and liquids. The liquids, predominantly water, are piped off as overflow from derrick cyclones 250 by pipe 270 (which may be approximately a 6" pipe) which feeds a steel cylindrical mixing tank 280, located below cyclone assembly 250. Tank 280 may measure approximately 15' tall and 4' in diameter. The liquid settles in tank 280, removing further fines, before being pumped by second pump 290 into fourth settling pond 90. Once in fourth settling pond 90, the water has entered the detention/retention pond recycling water network as described above.

Solids from cyclones 250 are gravity fed onto a derrick de-watering screen (not shown) which may have a 0.25 mm mesh. The screen separates the fine silt, referred to herein as "cyclone sand", from retained water. The fine cyclone sand is carried on top of the screen to chute 300 where the sand falls onto a collecting pile 307 below. Any remaining water passing through the de-watering screen is recycled back to sump 200 by a pipe (not shown, which may be 6" pipe). The cyclone sand collected at the bottom of chute 300 is transported to a stockpile by a loader where it is left to dry before being sold and moved.

Flocculant

Figure 3:
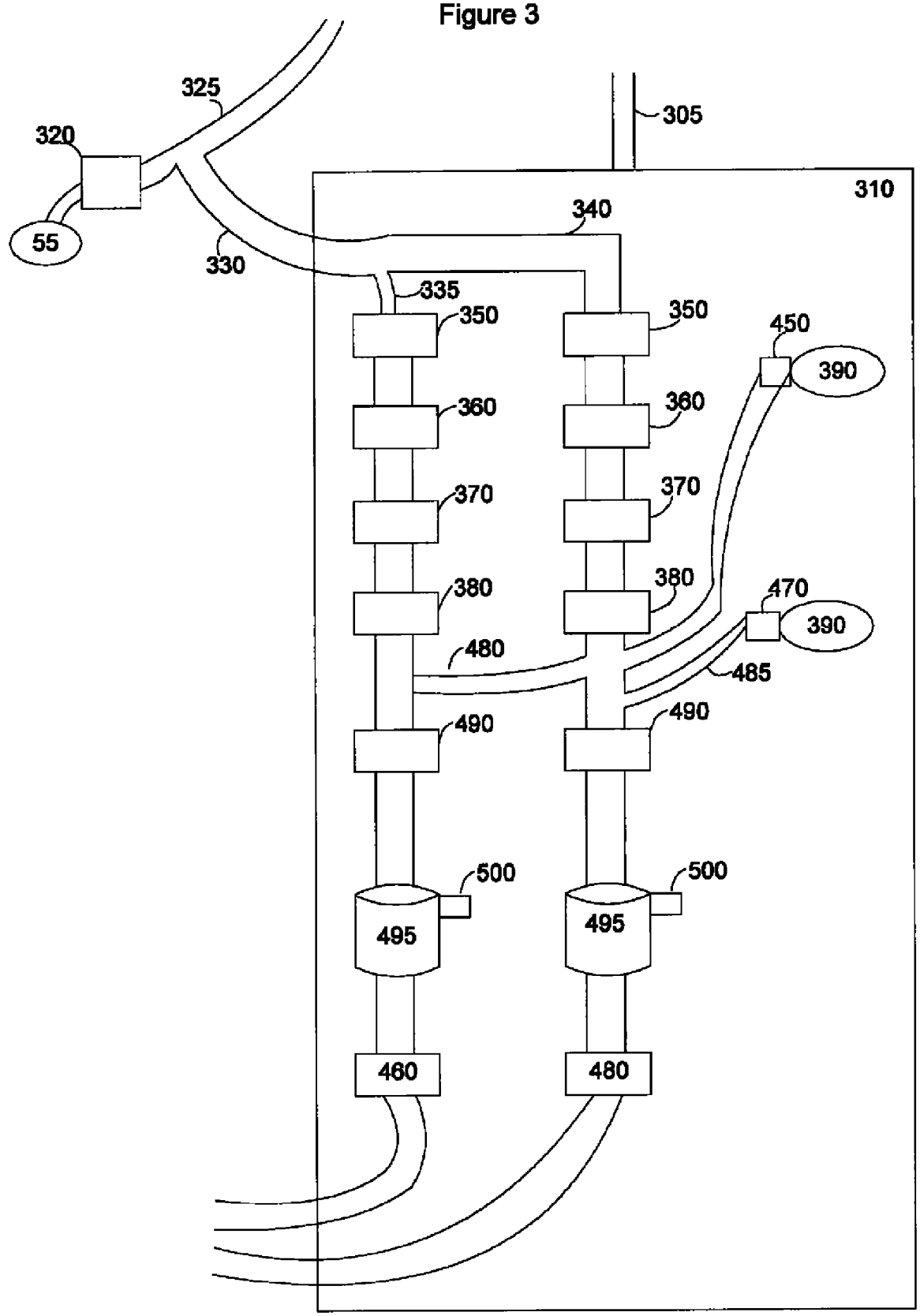
FIG. 3 is a block diagram of water flow outside of a flocculent storage facility according to the invention.

When flocculent is used according to the invention, the water to be processed at the pit follows the same pathway as described above until it is discharged from first pump 215. A closed gate valve on pump 215's discharge line, just after the fork 260, forces the water through pipe 305 (preferably approximately a 4" pipe). Pipe 305 bypasses derrick tower assembly 240 and instead, pipe 305 runs the process water over to flocculant storage facility 310, as seen in FIG. 3. Flocculant storage facility 310 is a convenient locale in which to store the first and second flocculants and dilute the same, however alternative arrangements are also feasible, such as first and second flocculant each being stored in separate buildings, or being purchased pre-diluted, or otherwise being diluted offsite. Outside flocculent storage facility 310, a solution of a first flocculant is added to pipe 305 while a second flocculant is added to pipe 305 further downstream. First and second flocculants may be diluted within flocculent storage facility 310 as explained below.

Flocculant Storage Facility

As flocculants, such as a preferred first flocculent (Product No. 8757 from Chemical and Consulting Solutions, LLC) and a preferred second flocculent (Product No. 9285 from Chemical and Consulting Solutions, LLC) are expensive, and both flocculants are available in 2290 lb totes at $US 3000-3700 per tote, the flocculants should be consumed wisely. Inside flocculant storage facility 310 a dilution/mixing assembly is arranged to disperse the flocculants homogenously and provide that they are not used to excess.

Freshwater, for example from first source pond 55, is pumped by third pump 320 through pipe 325 to service the aggregate plant, for example the crusher and sand plant. At a position, which may be approximately 4' from third pump 320's outtake, a line 330 branches off of pipe 325 (preferably about 2") to feed freshwater to flocculant storage facility 310. Entering flocculant storage facility 310, line 330 divides into two separate lines 335, 340 (preferably about 1" lines) that service the two different flocculent dilution assemblies. Each line 335, 340 may be assembled in the same manner, thus only one is described below, but the other line is similarly arranged.

Once flowing in line 335 or 340, the freshwater initially passes through pressure regulator 350 set to about 45 psi+/−5 psi. Once the pressure is regulated the freshwater flows past a precautionary pressure shut-off valve 360 which activates itself if the line pressure exceeds a value, such as 45 psi. Next along line 335 or 340 is solenoid switch 370 which regulates the freshwater flow. A spring check valve 380 follows solenoid switch 370. Check valve 380 prevents backflow or loss of flocculent concentrate which has been pumped from source tank 390 to line 335 or 340. Flocculant enters freshwater line 335 or 340 just downstream of check valve 380. The flocculent concentrates are pumped by pump 450 (the first flocculent) and 470 (the second flocculent) through lines 480, 485 respectively, at an automated pressure, as shown in FIG. 3.

Once the flocculent concentrate is in line 335 or 340, the heterogeneous mixture flows through a mixing chamber 490, such as a 1" USA Blue Book® mixing chamber. Upon leaving mixing chamber 490 the resultant flocculent solution is now homogenous. Once the solution is mixed, the solution should contain approximately 1% flocculent (i.e. 10 ml of flocculant for every 1 L of solution). Line 335, 340, then proceed to feed the solution into tank 495 where the solution is stored or pumped by pumps 460 (for the first flocculent) or pump 480 (for the second flocculent). Pumps 460 and 480 force the solutions outside flocculant storage facility 310 where they are injected into the line of process water at locations described below.

The system regulates itself by float switch 500 in each concentrate source tank 390. Float switch 500 activates pumps 450 or 470 as well as solenoid switch 370 if the volume of the 1% solution falls below a level, such as one quarter. Subsequently the tank is filled up and the float switch circuit is broken.

Flocculant Addition

Figure 4:
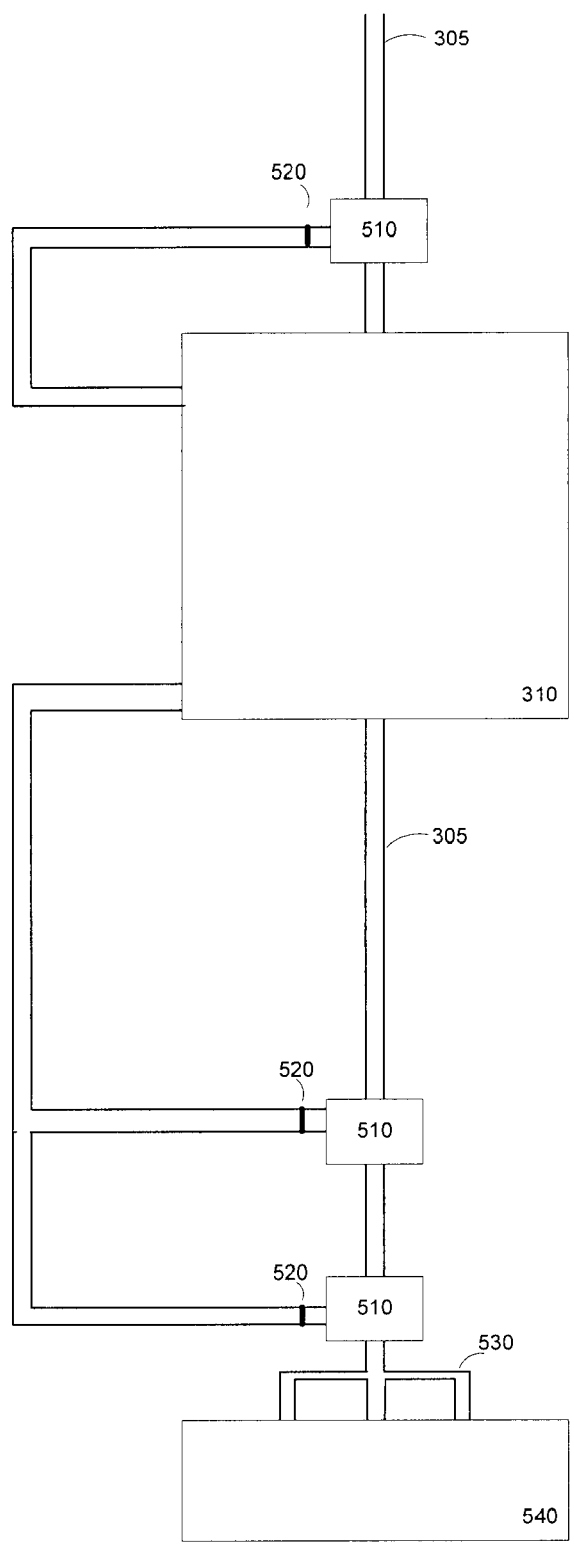
FIG. 4 is a block diagram of the flocculant dilution assembly within a flocculant storage facility according to the invention.
Figure 5:
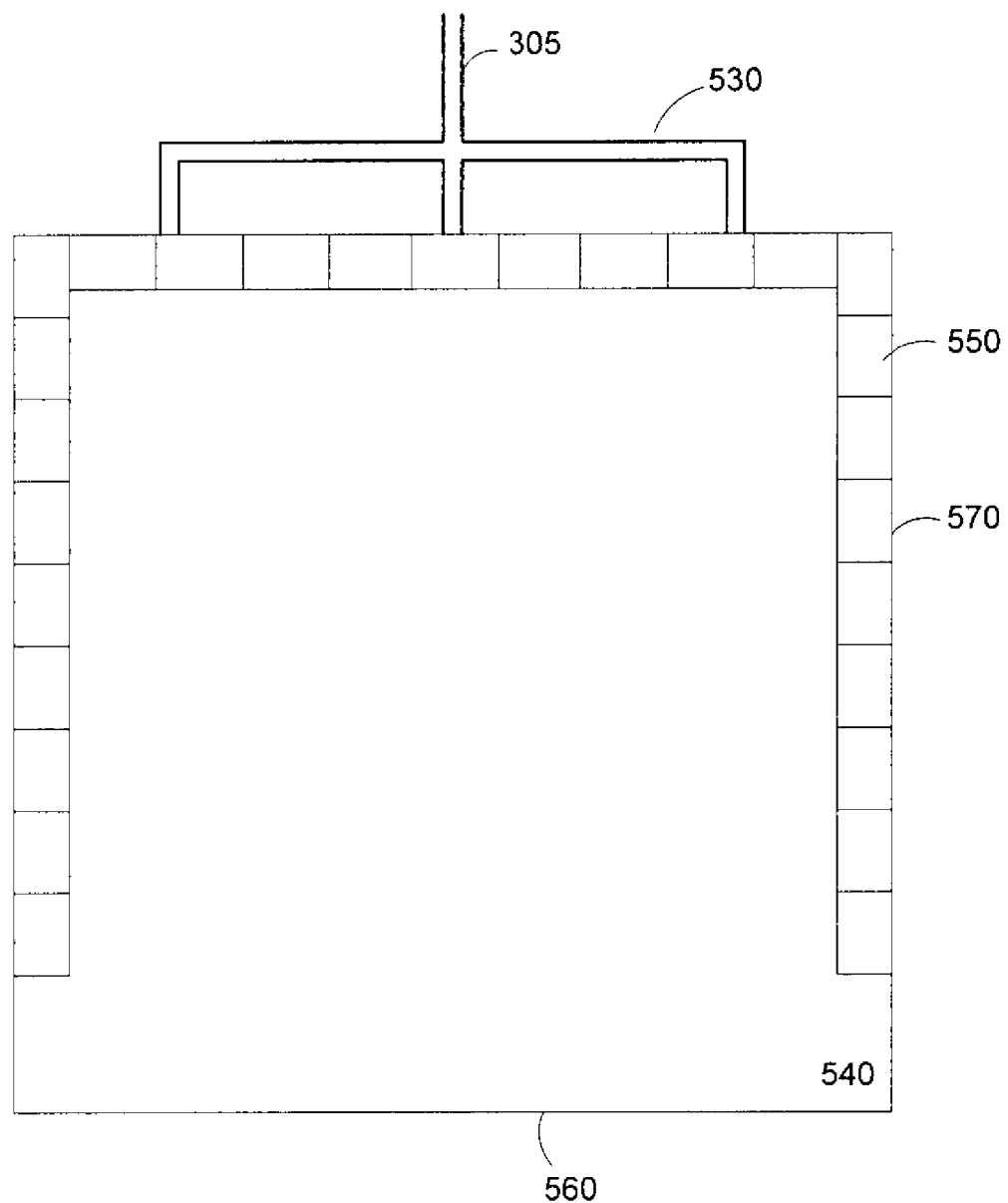
FIG. 5 is a block diagram of a discharge manifold into a stac-a-bloc pond according to the invention.

Once diluted, the flocculant solutions are injected into the pit process water at up to three locations. The first flocculant is injected first just outside flocculant storage facility 310, as shown in FIG. 4. The second flocculant is introduced at two sites: the first site approximately 50' downstream of flocculant storage facility 310 and the second site just before discharge of the water. Each injection site 510 has a lever valve 520 for manually regulating flocculant flow. A three outlet manifold 530 discharges the treated water into a rectangular storage pond 540 (preferably approximately 60'×15'×15') shown in FIG. 5. Three sides of the pond may be constructed with removable, concrete, stac-a-bloc units 550, while the remaining end wall is a removable steel gate 560. Within the stac-a-bloc pond 540 the solids, termed 'floc-sand', precipitate out of solution as 1-2 cm diameter pellets and settle to the bottom of the pond. The liquid or clear water is allowed to overflow the approximately 60'×15' stac-a-bloc retaining wall 570. This water then flows with gravity into fourth settling pond 90 where it enters the detention/retention pond system as described above. Later, the retaining wall 570 is removed and a front-end loader is used to relocate the floc-sand to floc-storage pond 585 nearby.

Flocculant with Hopper

In an alternative embodiment of the invention, process water follows the same route as above and is treated in the same manner except for one alteration. Instead of discharging directly into stac-a-bloc pond 540 the discharge manifold is positioned over two 10'×10' inverted pyramid hoppers 580. Once discharged into hoppers 580 the precipitated floc-sand settles while the clear water overflows. The overflow water enters streams that gravity feed into fourth settling pond 90 where the water enters the detention/retention system. The floc-sand enters underflow piping 590 (preferably 10" piping) that is gravity fed into stac-a-bloc pond 540. Once the stac-a-bloc pond 540 is filled with floc-sand, steel gate 560 is removed and a loader is used to relocate the sand to a floc-storage pond 580-585 for future use.

In another alternative embodiment of the invention, slurry pumps may be used to extract sand rather than front end loaders or the like.

Once the floc-sand has been hauled offsite to the first pit and allowed to set for a day, the mass may begin to crack due to drying and can be comfortably walked upon, indicating that the sand is easy to handle and transport and is usable for machinery. As the floc-sand contains fines as well as coarse grain particles, the binding is improved and the floc-sand has a better overall consistency.

Tests have shown that the floc-sand can support grass, due to high nitrogen levels. Alternatively, the floc-sand may be combined with biosolids for use as a growing medium. Another option is to use floc-sand in cob storage facilities as a component to their matted walls and roof.

Although the particular preferred embodiments of the invention have been disclosed in detail for illustrative purposes, it will be recognized that variations or modifications of the disclosed apparatus lie within the scope of the present invention.

We claim:

1. A method of removing solids from process water, comprising the steps of:
   (a) receiving process water discharged from an aggregate plant;
   (b) passing said process water through a mesh screen to remove rocks and debris;
   (c) collecting said process water in a sump;
   (d) passing said water through a plurality of centrifugal cyclones to remove fines from the water;
   (e) introducing a flocculant into said process water from the cyclones, wherein a first flocculant solution is introduced to said process water at a first location; a second flocculant solution to said process water at a second location downstream of said first location and just before a storage pond;
   (f) discharging said process water into said storage pond, said pond having a wall of concrete blocks, wherein floc-sand precipitates from said process water; and
   (g) discharging a clear water solution from said storage pond into a settling pond.

2. The method of claim 1 wherein said process water enters said storage pond through a manifold.

3. The method of claim 2 wherein said manifold is positioned over a hopper, wherein said hopper collects floc-sand precipitated from said process water.

4. The method of claim 2 wherein said manifold is a three outlet manifold.

5. The method of claim 1 wherein said flocculant is stored within a flocculant storage facility.

6. The method of claim 5 wherein said flocculant is diluted within said flocculant storage facility.

7. The method of claim 6 wherein said flocculant is diluted with freshwater fed to said flocculant storage facility at a regulated pressure and said flocculant is mixed to a resultant homogeneous flocculant solution.

8. The method of claim 5 wherein said first flocculant solution is introduced outside said process water entering said flocculant storage facility.

9. The method of claim 5 wherein said second flocculant solution is introduced approximately about 50 feet downstream of said flocculant storage facility.

10. The method of claim 1 further comprising:
(h) removing said floc-sand precipitates from said storage pond, and allowing said floc-sand precipitate to set for a day.

11. The method of claim 1 wherein said first and second flocculant solutions contain approximately about 1% flocculant.

12. The method of claim 1 further comprising introducing a third flocculant solution to said process water.

13. The method of claim 12 where said third flocculant solution is introduced just prior to discharge of said process water into said storage pond.

14. The method of claim 1 wherein said floc-sand precipitates form approximately between about 1 cm to 2 cm diameter pellets.

* * * * *